United States Patent Office 3,213,049
Patented Oct. 19, 1965

3,213,049
METHOD OF FORMING AN AQUEOUS DISPERSION OF POLYURETHANE
Herbert L. Heiss, New Martinsville, W. Va., assignor to Mobay Chemical Company, Philadelphia, Pa., a corporation of Delaware
No Drawing. Filed June 19, 1961, Ser. No. 117,849
20 Claims. (Cl. 260—29.2)

This invention relates generally to elastomeric, substantially non-porous polyurethanes and polyamides and more particularly, to a novel and improved method for making an adduct which can be cured and shaped into a substantially non-porous elastomer.

Substantially non-porous polyurethane elastomers are prepared by reacting a resinous organic compound having at least two reactive hydrogen atoms determinable by the Zerewitinoff method with an organic polyisocyanate and a chain-extender. Processes suitable for making polyurethane elastomers are disclosed in the art, for example, in U.S. Patents 2,621,166, 2,729,168 and Reissue Patent 24,514. The elastomer can be prepared either by a millable gum process resembling the process used in the rubber industry or by a casting technique wherein a liquid polyurethane is cured in a mold to form a solid elastomer. Usually, the organic compound containing reactive hydrogen atoms has a molecular weight above 500 and is reacted with an excess of an organic polyisocyanate to produce an adduct having terminal —NCO groups. This adduct is then reacted with a chain-extender such as water, diamine or glycol. An amount of polyisocyanate at least equivalent to all of the reactive hydrogens of the resinous organic compound and of the chain-extender is used in order that cross-linking will occur with solidification into an elastomer. Because the adduct is very viscous, mixing with the chain-extender is difficult.

One process which has been proposed for making an elastomer involves the preparation of a prepolymer through reaction of a poly(tetramethylene ether) glycol with an excess of an arylene diisocyanate and then chain-extending the resulting adduct with a relatively small amount of water. Such a process is disclosed, for example, by Hill in U.S. Patent 2,929,800. In accordance with such a process, the water is not added until after a prepolymer has been prepared and the amount of water is limited usually to less than about 10 percent in order that the number of urea groups in the resulting product resulting from reaction with water will be limited to the point where the physical characteristics of the resulting elastomer are not deleteriously effected. It has been disclosed that a poly(alkylene ether-thioether) glycol can be substituted for the poly(tetramethylene ether) glycol in a millable gum process like that of the Hill patent.

Although it has long been recognized that such millable gum and casting processes are not as advantageous as extrusion and compression molding processes for making many elastomeric articles and there are extrusion and compression molding techniques suggested in the art, no polyurethane adduct which is entirely suitable for extrusion or compression molding has been available so such processes have not met with much commercial success. Ordinarily, a polyurethane is a thermosetting material and is not adapted for extrusion or compression molding. Many of the heretofore suggested processes for making a polyurethane adduct which can be extruded or compression molded have required very close control of the reaction temperature and time in order to stop the reaction before it has reached the point where the material becomes thermosetting. Even the most skilled technicians find it difficult if not impossible to repeatedly prepare polyurethane adducts having substantially the same physical characteristics and hence the same extrudability by these disclosed processes.

It has been proposed to prepare a latex for use in coating or molding operations by reaction of an organic polyisocyanate with an organic compound having reactive hydrogens. For example, Malonee discloses such a process in U.S. Patent 2,968,575. Recognizing that an organic diisocyanate is very reactive with water, Malonee reacts the polyisocyanate with a poly(alkylene ether) glycol or other organic compound having reactive hydrogens under substantially anhydrous conditions to form a prepolymer which is subsequently emulsified in water where a chain-extension reaction occurs with the water. A process of the type disclosed requires slow addition of the prepolymer to the water which is disadvantageous in large scale production. Moreover, the prepolymer is too viscous to be handled conveniently unless it is diluted with a solvent. Processes which require two steps of this type are more expensive and more cumbersome than processes where the organic polyisocyanate can be reacted with the resinous organic component having reactive hydrogen in the presence of a chain-extender.

It is therefore an object of this invention to provide a method for preparing an adduct adapted to be shaped by extrusion or compression molding devoid of the foregoing disadvantages. Another object of the invention is to provide an improved method for making latices adapted to be used in coating non-woven fabrics, paper and the like with elastomers prepared from organic polyisocyanates and organic compounds containing reactive hydrogen. Another object of the invention is to provide a one-step process for making a polyurethane or polyamide latex. A further object of the invention is to provide a one-step process for making a shaped, cured polyurethane or polyamide elastomer in which a granular adduct is first formed which latter can be shaped into a cured elastomeric article. A still further object of the invention is to provide a method for making a granular polyurethane which can be extruded, compression molded or the like and cured into an elastomeric product.

The foregoing objects and others are accomplished in accordance with this invention, generally speaking, by providing a one-step process for dispersing a polymer in water wherein a liquid organic compound free from primary and secondary amino groups having a total of at least two hydroxyl and/or carboxyl groups and a molecular weight of at least about 60, an organic polyisocyanate and a catalyst which promotes reaction of —NCO groups with the said hydroxyl and/or carboxyl groups in preference to reaction of —NCO groups with water, urea, urethane and/or —NCO groups are mixed together and the resulting mixture is substantially immediately submerged in water. The resulting two-phase system is agitated to disperse the organic phase in the water phase as droplets or particles while an emulsifier is present in the water.

An apparatus of the type disclosed in U.S. Reissue Patent 24,514 or any other suitable apparatus adapted to discharge the mixture rapidly substantially immediately after mixing can be used for mixing the organic compound having reactive hydrogens, organic polyisocyanate and catalyst. The components of the reaction mixture must be mixed together rapidly and the resulting mixture is to be added to the water phase before any substantial chemical reaction with accompanying increase in viscosity. Any container provided with a stirrer such as a conventional barrel, tank or the like provided with a propeller type agitator can be used for making the dispersion.

In order that urea formation by reaction with water will not be excessive, all possible steps should be taken to accelerate urethane or amide formation. One such step is to include the catalyst in the organic phase before it is submerged in the water. Reaction between —NCO and the hydroxyl or carboxyl groups of the organic compound is also encourged if the organic phase is at an elevated temperature of about 25° C. to about 40° C. or higher at the time it is submerged in water. For this reason, it is sometimes desirable to heat the organic compound having reactive hydrogens and a molecular weight of at least about 60 to a temperature of above 30° C. and preferably 75° C. to 100° C. This heated component is then mixed with organic polyisocyanate which is at room temperature. The reaction between the polyisocyanate and organic compound having reactive hydrogens is an exothermic reaction so some increase in temperature results from chemical reaction before the organic phase is submerged in the water. Some chemical reaction proceeds as soon as the polyisocyanate and organic compound having reactive hydrogens are mixed together but the reaction mixture is submerged in the water before an adduct of any appreciable viscosity or chain length increase is formed.

In one embodiment of this invention, a substantially stable latex is formed. This is achieved by mixing the said organic compound having reactive hydrogen and a molecular weight of at least about 60 with organic polyisocyanate and catalyst and submerging the resulting mixture substantially immediately in a volume of water larger than the volume of the mixture. It is important that an emulsifying agent be present in the water and that the water be agitated at the time the reaction mixture is submerged therein in order that the reaction mixture will be broken up into droplets before sufficient chemical reaction has occurred to form a viscous liquid or semi-solid adduct. The resulting two-phase system which resembles an oil in water emulsion is agitated sufficiently to maintain the dispersion of droplets therein until chemical reaction has proceeded to the point where coalescence will not occur when the system becomes quiescent. A latex formed in this way is stable and will remain as a dispersion for several months. The particles of polyurethane in the latex are usually colloidal in size, i.e. about 0.005 to above 0.2 micron. When it is desired to use the adduct for making a cured elastomer, the particles can be salted out or separated from the liquid phase by filtering or other means. The dried product can then be used to make vehicle tires, machine parts such as bearing surfaces, and various other rubber-like articles. The latex can be used per se for coating paper, fibers, non-woven fabrics, and the like.

In another embodiment of the invention, the said organic compound having a molecular weight of at least about 60, organic polyisocyanate and catalyst are mixed together as before but this time the resulting mixture is submerged in water which does not contain an emulsifying agent. The reaction mixture does not break up into droplets but instead remains more or less as a single insoluble liquid phase and chemical reaction proceeds until a soft paste or semi-solid is submerged in the water. At this point, an emulsifying agent is added and the two-phase system is stirred rapidly until particles of the resinous phase become suspended in the water. Chemical reaction proceeds while agitation is continued until solid particles are obtained which are not tacky and will not agglomerate when the system becomes quiescent. This embodiment of the invention usually produces particles one millimeter in diameter or larger depending upon, inter alia, the speed of the agitator and the extent of chemical reaction before the emulsifier is added. Particles produced in this way can be separated from the water phase by filtration or other suitable means and subsequently dried in a suitable oven. The resulting product can be used for making bearings, shoe lifts and the like by extrusion or compression molding techniques.

In some instances, the adduct prepared as a dispersion in accordance with this invention can be cured without adding more polyisocyanate but tests results are obtained if additional polyisocyanate is mixed with the particles before compression molding or extruding. One method for effecting such a mixture of the particles with the polyisocyanate is to mix the particles with a powdered organic polyisocyanate and to tumble or otherwise stir the mixture until the powdered polyisocyanate becomes a coating on the surface of the resinous particles. The dimer of 2,4-toluylene diisocyanate, p,p'-diphenyl methane diisocyanate, p,p'-diphenyldimethylmethane diisocyanate and a di(isocyanate) urea such as for example N,N'-bis(3-isocyanate-4-methyl phenyl) urea and the like are particularly well suited for this purpose but polyisocyanate which are liquid under ordinary conditions of temperature and pressure, such as toluylene diisocyanate, can be used. The amount of polyisocyanate added to the solid particles can vary from none to an amount equivalent to the reactive hydrogen content of the reaction product. Preferably, from about 2 to about 10 parts by weight 2,4-toluylene dimer per 100 parts by weight particles of reaction product or an equivalent amount of —NCO of another polyisocyanate is used.

Any catalyst which will promote reaction at a more rapid rate between an —NCO group and an hydroxyl or carboxyl group than reaction between an —NCO group and the reactive hydrogen of water, a urea linkage or a urethane linkage and will encourage reaction between —NCO and —OH or —CCOH in preference to polymerization of —NCO groups can be used in this invention. Any catalyst which will cause the gelatin in less than 100 minutes at 70° C. of a mixture of 1 gram of polypropylene ether triol having an —OH number of 56, a molecular weight of about 3000 and prepared by condensation of propylene oxide and glycerine, 9 grams of dioxan and 8.7 grams of an 80 percent 2,4-toluylene diisocyanate and a 20 percent 2,6-toluylene diisocyanate mixture is one which properly catalyzes reactions of —NCO with hydroxyl groups.

To be suitable, however, for this invention, the catalyst must also be one which does not accelerate reaction between —NCO and water as much as it is acelerating the reaction between hydroxyl and —NCO.

The catalyst must also be one which does not appreciably accelerate preferential reaction of —NCO with itself to form isocyanurate rings or reaction of —NCO with either a urea linkage or urethane linkage having reactive hydrogen, rather than the reaction of —NCO with —OH groups. A reaction between —NCO groups with urea and urethane groups leads to undesirable branching of the chain through formation of biuret and allophonate linkages. This property of the catalyst can be determined by mixing 1 gram of the catalyst with 9 grams dioxan and 100 grams of a polypropylene ether toluylene diisocyanate prepolymer having terminal —NCO groups. The mixture is immediately heated to 70° C. and if it gels in less than one hour at 70° C. the catalyst is unsuitable for the purposes of this invention.

A suitable prepolymer for the latter test is prepared by heating 60 parts by weight of a polypropylene ether glycol having a molecular weight of 2000 and an hydroxyl number of 56 and 40 parts of a polypropylene ether triol prepared by condensation of propylene oxide and glycerine and having a molecular weight of about 3000 and an hydroxyl number of 56 with 12 parts of an 80 percent 2,4-toluylene diisocyanate and 20 percent 2,6-toluylene diisocyanate mixture at 115° C. When the resulting adduct reaches a viscosity of 2000 centipoises at 73° C., 28 parts of the same mixture of toluylene diisocyanate are added and the mixture is cooled to room temperature.

Compounds which have been found particularly well suited as catalysts for this invention are the stannous salts of carboxylic acids having from 2 to 18 carbon atoms, such as, for example, stannous octoate, stannous laurate, stannous stearate, stannous acetate, stannous butyrate, and the like and mixtures thereof. Other compounds which are suitable for the purpose include dibutyl tin dimaleat, tributyl tin oxide, dibutyl tin sulfide, lead resinate, lead benzoate, lead salicylate, lead 2-ethyl hexoate, lead oleate, iron acetyl acetonate, cobalt benzoate, tetra (2-ethyl hexyl) titanate, tetra butyl titanate, and the like. Many other compounds accelerate the reaction of an hydroxyl or carboxyl group with an isocyanate in preference to reaction between an isocyanate and the reactive hydrogens of water, a urea linkage, a urethane linkage or reaction of —NCO to form isocyanurate rings. Any of these compounds can be used. The foregoing list of specific examples are only the preferred compounds and are given for the purpose of illustration and not limitation. Any suitable tertiary amine can be used along with the metallic catalyst, such as, for example, triethylene diamine, N-ethyl morpholine, N-methyl morpholine, a 1-alkyl-4-dialkyl amino ethylpiperazine, such as, 1-methyl-4-dimethyl amino ethyl piperazine, and the like, if desired.

Any suitable organic polyisocyanate may be used for the preparation of the adducts of the invention including aromatic, aliphatic and heterocyclic polyisocyanates, such as, for example, tetramethylene diisocyanate, dodecamethylene diisocyanate, 3,3'-diisocyanato dipropyl ether, xylylene diisocyanate, p,p'-diphenylmethane diisocyanate, $\beta,\beta'$-diphenylpropane-4,4'-diisocyanate, undecamethylene diisocyanate, m-phenylene diisocyanate, p-phenylene diisocyanate, 2,4-toluylene diisocyanate, naphthylene-1,4-diisocyanate, naphthylene-1,5-diisocyanate, 2,6-toluylene diisocyanate, 1,3,5-benzene triisocyanate, p,p',p"-triphenylmethane triisocyanate, furfurylidene diisocyanate, 1,4-cyclohexyl diisocyanate, and the like. The addition products of polyisocyanates with less than a stoichiometric equivalent amount of a low molecular weight alcohol, such as, 1,4-butane diol, glycerine, trimethylolpropane, the hexanediols and hexanetriols, and addition products of the aforementioned polyisocyanates with acetals as described in copending application Serial No. 821,360 may be used. The isocyanate polymers described in German patent specification Nos. 1,022,789 and 1,027,394, as laid open to inspection, are also suitable for the purpose. Mixtures of organic isocyanates may be employed if desired. A particularly advantageous mixture is an 80 percent 2,4-toluylene diisocyanate and 20 percent 2,6-toluylene diisocyanate mixture.

Any suitable organic compound containing at least two hydroxyl and/or carboxyl groups having the specified molecular weight can be used. Preferably, such a compound should have a molecular weight of from about 60 to about 4000. Preferably, the sum of the hydroxyl plus carboxyl numbers or, in other words, the reactivity number, should not exceed about 1900. The preferred sum of carboxyl and hydroxyl numbers for a molecular weight range of 60 to 4000 is about 1870 to about 28. If the product is only hydroxyl terminated, the preferred range of hydroxyl number is from about 28 to 1870. Reactive hydrogen in an alcoholic hydroxyl group can be determined by the Zerewitinoff method described in Kohler, J. Am. Chem. Soc. 49, 3181, 1927. If the adduct is to be a polyurethane, the compound should preferably have a predominant number of hydroxyl groups while a polyamide is produced if the product is terminataed predominately in carboxyl groups. A mixed polyurethane-polyamide is produced if both carboxyl and hydroxyl groups are present. Examples of suitable compounds for reaction with the organic polyisocyanate include ethylene glycol, diethylene glycol, triethylene glycol, adipic acid, succinic acid, phthalic acid, terephthalic acid, maleic acid, malonic acid, polyhydric poly (alkylene ethers), polyesters having either terminal alcoholic hydroxyl groups or carboxyl groups or both, polyhydric polythioethers, polyacetals, the polymer of carbon monoxide and an olefin, polyesteramides, and the like.

The polyester can be prepared from either aromatic or aliphatic acids and alcohol. Examples of suitable carboxylic acids for making the polyester are adipic acid, succinic acid, phthalic anhydride, terephthalic acid, maleic acid, malonic acid and the like including those disclosed in U.S. Patent Reissue 24,514. Examples of suitable polyhydric alcohols for making the polyester are ethylene glycol, diethylene glycol, hexane diol and the like including those disclosed in U.S. Patent Reissue 24,514. If the polyester is to be carboxyl terminated, an excess of the acid is used. If it is to be hydroxyl terminated, an excess of the glycol should be used. If a polyurethane is desired, it is preferable that the polyester have a molecular weight of at least about 500, an hydroxyl number of not more than about 225 and an acid number of not more than about 10. If a polyamide is desired, the polyester should have a molecular weight of at least about 500 and an acid number greater than about 20.

The polyhydric poly(alkylene ether) can be prepared by condensing any suitable alkylene ovide such as, for example, one having two, three or four carbon atoms or by condensing an alkylene oxide with a polyhydric alcohol. Another method for preparing the polyhydric poly(alkylene ether) is by condensing tetrahydrofuran into a polytetramethylene ether glycol. Among the suitable alkylene oxides are ethylene oxide, propylene oxide, butylene oxide, amylene oxide and the like. Any of the glycols and triols mentioned above with reference to the polyester preparation can be condensed with an alkylene oxide to form a poly(alkylene ether) glycol. If desired, the polyhydric poly(alkylene ether) can be prepared from a mixture of alkylene oxides.

A polythioether suitable for this invention can be prepared by any known process, such as, for example, by condensing thiodiglycol or by condensing a thioglycol, such as, thiodiglycol with a glycol, such as, ethylene glycol, diethylene glycol or the like. Methods for making polythioethers suitable for this invention are disclosed in U.S. Patents 2,862,972 and 2,900,368. A suitable polyester amide can be prepared from any of the acids listed above and a siutable amino alcohol, such as ethanolamine or a mixture of amino alcohol, such as, ethanolamine, with a glycol, such as ethylene glycol.

Any suitable polyacetal may be used, such as, for example, one prepared by condensing an aldehyde with a polyhydric alcohol. The condensation product of formaldehyde and ethylene glycol is an example of a suitable compound.

A copolymer of carbon monoxide and an olefin suitable for use in this invention may be prepared in accordance with the process disclosed in U.S. Patent 2,839,478. An ethylene-propylene carbon monoxide copolymer is particularly well suited for the purpose.

Still another polyhydroxy compound suitable for making the polymer of the invention is castor oil.

It is to be understood that in each instance it is preferable that the polyester, polyhydric poly(alkylene ether), polyester amide, polyacetal, polythioether glycol or copolymer of carbon monoxide and an olefin have a molecular weight of at least about 500, an acid number of less than about 10 and an hydroxyl number of not more than about 225.

For many purposes it is advantageous to use both a resinous material, such as, a polyester, poly(alkylene ether) glycol, polythioether glycol or the like having a molecular weight of about 500 or more and a compound having molecular weight of less than 500, such as, ethylene glycol, diethylene glycol, trimethylol propane, succinic acid or the like. Usually the two compounds having reactive hydrogen and the different molecular weights are mixed simultaneously with the polyisocyanate. A product prepared from such a mixture will have its urethane group spaced more closely together than a product prepared only from the higher molecular weight compound and polyisocyanate. The amount of compound having reactive hydrogen and a molecular weight of less than about 500 should be preferably from zero to about 10 mols per mol of compound having a molecular weight above about 500.

When elastomers are desired, best results are usually obtained if the organic compound having reactive hydrogens is difunctional and the polyisocyanate is a diisocyanate. For this reason, it is preferred to use an organic diisocyanate and one of the poly(alkylene ether) glycols, dihydroxy or dicarboxy polyesters, polythioether glycols or the like listed hereinbefore. However, it is to be understood that a polyhydric alcohol, such as, glycerine, trimethylolpropane, pentaerythritol, sorbitol or the like and/or a polyisocyanate having more than two —NCO groups can be used alone or in admixture with the polyester or the like.

Any suitable emulsifying agent which will produce an oil in water emulsion can be used in this invention including those disclosed in U.S. Patent 2,968,575. Poly(alkylene ether) glycols of long-chain alcohols, tall oil, alkyl sulfonic acids, fatty acid soaps, alkyl aryl sulfonic acids, alkali metal salts of high molecular weight, quaternary ammonium salts, alkyl sulfonic acids, such as, ethane sulfonic acid, alkyl aryl sulfonic acids, and the like are suitable.

In the embodiment which produces latices, it is advantageous to include a protective colloid as well as an emulsifying agent in the water phase in order to discourage coalescence. Any suitable protective colloid, such as, for example, gum arabic, gum tragacanth, locust bean gum, karaya gum, casein, hydroxyethyl cellulose, carboxylmethyl cellulose, ethylene-maleic anhydride copolymers, carboxyvinyl polymers, and the like can be used for this purpose.

In order better to describe and further clarify the invention, the following are specific examples thereof, the parts being by weight unless otherwise specified.

*Example 1*

About 5 parts by weight of a non-ionic emulsifier which is a condensation product of 1 mol castor oil and about 40 mols ethylene oxide are dissolved in about 500 parts water at a temperature of about 20° C. and about 2 parts N-ethyl morpholine are added to the solution. In a separate container, about 170 parts of poly(oxypropylene) glycol having a molecular weight of about 2000 and an hydroxyl number of about 56, about 30 parts of an 80 percent 2,4-toluylene diisocyanate and a 20 percent 2,6-toluylene diisocyanate mixture and about 1 part stannous octoate are mixed together. The resulting mixture is immediately added to the water solution while the water is being rapidly agitated such as by a Waring Blendor. The resulting polymer coagulates and then becomes dispersed as discrete particles in the water. The water temperature after the reaction is completed is about 35° C. Agitation is continued for about 30 minutes to one hour or until the particles have reached the point where they will no longer coalesce while the slurry is not being agitated. The water phase is then separated from the organic phase such as by filtration and the product is air dried. The dried product is a white, free-flowing polyurethane which can be used for making a cured urethane elastomer.

*Example 2*

About 3 grams of Emulphor EL719, a condensation product of castor oil and ethylene oxide, are dissolved in about 300 parts water at 20° C. contained in a vessel provided with agitator. In a separate container provided with an agitator, about 170 grams of a poly(oxypropylene) glycol having a molecular weight of about 2000 and an —OH number of about 56, about 30 grams of a mixture of 80 percent 2,4-toluylene diisocyanate and 20 percent 2,6-toluylene diisocyanate, and about 1 gram stannous octoate are rapidly mixed together. The resulting mixture is immediately poured into the 300 cubic centimeters water solution and the resulting mixture is agitated with a propeller-type agitator at about 3000 r.p.m. After about 2 hours of stirring, the agitation is stopped and the mixture is filtered to separate the organic phase from the water phase. The organic phase is dried at 30° C. at 10 mm. pressure. A white, granular product having an average particle size of about 1 mm. is obtained.

*Example 3*

About 5 parts by weight Emulphor EL719 and about 2 parts N-ethyl morpholine are dissolved in about 500 parts by weight water. In a separate container, a mixture is prepared of about 170 parts poly(oxypropylene) glycol having a molecular weight of about 2000 and a hydroxyl number of about 56, about 15 parts of a mixture of 80 percent 2,4-toluylene diisocyanate and 20 percent 2,6-toluylene diisocyanate and about 1 part stannous octoate. The —NCO to hydroxyl ratio in this mixture is about 1. Within two minutes of the formation of the mixture, it is dumped immediately into the water while the water is being rapidly agitated. Gas evolution is noted during the first 5 minutes. An organic phase coagulates and then becomes dispersed as particles in the water phase. The temperature of the water phase reaches a maximum of 35° C.

*Example 4*

Example 2 is repeated except that 200 parts water having a temperature of 55° C. is substituted for the 300 parts cold water of Example 2. The granular product obtained is dried for about 16 hours at 50° C. at atmospheric pressure and the product resembles that of Example 2 with the exception that it is slightly yellow in color and the average particle size is 3 millimeters.

*Example 5*

Example 2 is repeated with the exception that about 40 parts of carbon black particles are dispersed in the poly(oxypropylene) glycol before it is mixed with the toluylene diisocyanate. The resulting product is black in color and it appears that all of the carbon black is dispersed in the polymer because the water phase is clear.

*Example 6*

About 3 parts Emulphor EL719 are dissolved in 300 parts water having a temperature of about 20° C. In a separate container, about 170 parts poly(oxypropylene) glycol having a molecular weight of about 2000 and an hydroxyl number of about 56, about 30 parts of a mixture of 80 percent 2,4-toluylene diisocyanate and 20 percent 2,6-toluylene diisocyanate and 1 part stannous octoate are mixed together. The resulting mixture is dumped rapidly into the water while the water is being agitated with a propeller type agitator at a speed of about 3000 r.p.m. Two hours later, the product is separated from the water phase by filtering and dried at 50° C. at 10 mm. pressure. The product resembles that of Example 2.

*Example 7*

Example 6 is duplicated with the exception that about 60 parts of the toluylene diisocyanate mixture are used to provide an —NCO to —OH ratio of about 4. The amount of water in the water phase is 500 parts instead of 300. A white granule having an average particle size of about 2 mm. is obtained.

*Example 8*

About 3 parts of Emulphor EL719 are dissolved in about 500 parts water. In a separate container, about 170 parts of poly(oxypropylene) glycol having a molecular weight of about 2000 and an hydroxyl number of about 56, about 60 parts of an 80 percent 2,4-toluylene diisocyanate and 20 percent 2,6-toluylene diisocyanate mixture and about 1 part stannous oleate are mixed together. Almost immediately, this mixture is dumped into the water solution while the water is vigorously agitated. A suspension of particles of a polyurethane adapted to be compression molded or extruded is obtained.

Example 9

About 25 parts 2-amino-2-ethyl propanol is dissolved in the organic phase of Example 8 before it is added to the water. Otherwise, the process is the same as that of Example 8. The resulting product is a viscous liquid polymer.

The product obtained in each of the foregoing examples, with the exception of Example 9, can be compression molded at a temperature of about 260–300° F. and a pressure of 4000 lbs./sq. inch to form a light amber-colored product. Best results are obtained, however, if each of the foregoing products is mixed with from about 2 to about 10 parts of the dimer of 2,4-toluylene diisocyanate or an equivalent amount of another diisocyanate per 100 parts product and cured for about 30 minutes at 280° F. at a molding pressure of 2000 lbs./sq. inch.

Example 10

About 10 parts by weight Emulphor EL719 emulsifier are dissolved in about 2000 parts water. In a separate container, about 200 parts poly(oxypropylene) glycol having a molecular weight of about 2000 and an hydroxyl number of about 56, about 35 parts of an 80 percent 2,4-toluylene diisocyanate and 20 percent 2,6-toluylene diisocyanate mixture and about 1 part stannous octoate catalyst are mixed together. This mixture is added immediately to the water solution while the water is being rapidly agitated. Agitation is continued for about 2 hours at room temperature. The resulting latex is a suspension of white particles of polyurethane having a milky white appearance.

Example 11

About 45 parts monoethanol amine are dissolved in about 4000 parts water at about 20° C. In a separate container, about 1660 parts poly(oxypropylene) glycol having a molecular weight of about 2000 and an hydroxyl number of about 56, about 388 parts of a mixture of 80 percent 2,4-toluylene diisocyanate and 20 percent 2,6-toluylene diisocyanate and about 8 parts stannous octoate are mixed together for about 20 seconds. This mixture is then immediately added to the water containing the amine while the water solution is rapidly agitated. After the organic phase is dispersed in the water phase, about 10 parts EL719 emulsifier are poured in slowly. Agitation is continued with a 3-blade propeller type agitator turning at a speed of about 2400 r.p.m. The agitator has 2½ inch blades. This agitator is used when the container is a one-gallon wessel and the parts specified above are grams. Agitation is continued for about 1 hour at which point the product is filtered and washed with water. The product is then dried and is a white granular material having maximum cross-sectional dimensions of from 0.5 to 1.0 centimeter.

Example 12

About 80 parts by weight of a copolymer of maleic anhydride and ethylene are added to about 16000 parts warm water. Ammonium hydroxide is added until the pH of the solution is about 7. The resulting solution contains about 0.5 percent protective colloid.

About 200 parts by weight of poly(oxypropylene) glycol having a molecular weight of about 2000 and an hydroxyl number of about 56, about 35 parts of a mixture of 80 percent 2,4-toluylene diisocyanate and 20 percent 2,6-toluylene diisocyanate and about 1 part stannous octoate are mixed together in an apparatus of the type disclosed in U.S. Reissue 24,514. The resulting mixture is discharged from the apparatus immediately into about 2000 parts of the protective colloid solution prepared above. The protective colloid solution is being rapidly agitated as the other solution is added thereto and agitation is continued for about 2 hours. A latex is formed which can be used as such or can be filtered and dried and stored as a powder.

Example 13

About 200 parts poly(oxypropylene) glycol having a molecular weight of about 2000 and an hydroxyl number of about 56, about 44 parts of an 80 percent 2,4-toluylene diisocyanate and 20 percent 2,6-toluylene diisocyanate mixture and about 1 part stannous octoate are mixed together and substantially immediately poured into about 2000 parts of the protective colloid solution prepared in Example 12. The protective colloid solution is agitated as the solution is added and agitation is continued for about 2 hours. The resulting latex can be used as such or is filtered, dried and is ready to be used as a molding powder to prepare a cured polyurethane.

Example 14

About 200 parts by weight of a poly (oxypropylene) triol having a molecular weight of about 3000 and an hydroxyl number of about 56 which has been prepared by condensing propylene oxide with glycerine, about 44 parts of an 80 percent 2,4-toluylene diisocyanate and 20 percent 2,6-toluylene diisocyanate mixture and about 1 part stannous octoate are mixed together. The resulting mixture is rapidly added to about 2000 parts of the protective colloid solution prepared in Example 12. The protective colloid solution is agitated while the other solution is added and agitation is continued for about 2 hours. A latex is formed which can be used as such or filtered and dried.

Example 15

About 250 parts of the condensation product of propylene oxide and pentaerythritol having a molecular weight of about 5000 and an hydroxyl number of about 45, about 44 parts of an 80 percent 2,4-toluylene diisocyanate and 20 percent 2,6-toluylene diisocyanate mixture and about 1.25 parts stannous octoate are mixed together. The resulting mixture is substantially immediately discharged into about 2000 parts of the protective colloid solution prepared in Example 12. Agitation is continued throughout the addition of the liquid and for about 2 hours thereafter. The resulting latex can be used as such for coating paper or the like or filtered and dried to produce an adduct adapted to be cured by addition of polyisocyanate.

Example 16

Example 15 is repeated except that the toluylene diisocyanate is reduced to about 35 parts. The product is a latex which can be used for coating paper or the like.

Example 17

About 166 parts of a castor oil polymer having an acid number of about 5 and an hydroxyl number of about 128 and a molecular weight of about 900, about 84 parts of an 80 percent 2,4-toluylene diisocyanate and 20 percent 2,6-toluylene diisocyanate mixture, about 0.8 part stannous octoate and about 2 parts Emulphor EL719 are mixed together. The resulting mixture is added to about 2000 parts of a protective colloid solution of the type prepared in Example 12. A latex is obtained which can be used for coating paper or the like or can be filtered to provide particles of an adduct which can be cured by working up with additional polyisocyanate on a rubber mill.

Example 18

About 153 parts of castor oil having a molecular weight of about 925, an acid number of about 1 and an hydroxyl number of about 163, about 98 parts of an 80 percent 2,4-toluylene diisocyanate and 20 percent 2,6-toluylene diisocyanate mixture, about 0.7 part stannous octoate and about 2 parts Emulphor EL719 are mixed together. The resulting mixture is discharged immediately into about 2000 parts of a protective colloid solution of the type prepared in Example 1. The resulting latex is filtered and dried.

Example 19

In this example, 45 parts monoethanol amine are dissolved in the water as in Example 11. An additional 30 parts are added after the poly(oxypropylene) glycol-toluylene diisocyanate mixture has been added to the water. The product is a latex which can be filtered and dried and subsequently cured by reaction of additional polyisocyanate.

Example 20

About 2130 parts of a polyester prepared by esterification of adipic acid and diethylene glycol and having an hydroxyl number of about 45 and an acid number of about 1, about 388 parts of an 80 percent 2,4-toluylene diisocyanate and 20 percent 2,6-toluylene diisocyanate mixture, about 3 parts Emulphor EL719 and about 10.6 parts stannous octoate are mixed together. The resulting mixture is added to about 5700 parts of a water solution containing 45 parts monoethanolamine. The product is a latex which can be used for coating paper or separated from the water by filtering and drying.

About 100 parts of the dried product are mixed with about 7.5 parts of the dimer 2,4-toluylene diisocyanate and worked up on a rubber mill. The product is cured under heat and pressure to form an elastomer having a tensile strength of 6100 pounds per square inch and elongation of 815 percent, a Shore A hardness of about 70 and a tear of about 180 pounds per inch.

Example 21

About 43 parts of an 80 percent 2,4-toluylene diisocyanate and 20 percent 2,6-toluylene diisocyanate mixture, about 200 parts of a polyester prepared by esterification of adipic acid, diethylene glycol and trimethylol propane and having a molecular weight of about 2000, an hydroxyl number of about 57 and an acid number of about 1, about 1 part stannous octoate and about 2 parts Emulphor EL719 are mixed together. The resulting mixture is mixed with about 2000 parts of the protective colloid solution prepared in Example 12. The resulting latex can be used for coating paper or the like.

Example 22

About 44 parts of an 80 percent 2,4-toluylene diisocyanate and 20 percent 2,6-toluylene diisocyanate mixture, about 250 parts of a polyester having a molecular weight of about 2500, an hydroxyl number of about 45 and an acid number of about 1 prepared from adipic acid and diethylene glycol, about 1.25 parts stannous octoate and about 2 parts Emulphor EL719 are mixed together. This mixture is mixed with about 2000 parts of a protective colloid solution of the type prepared in Example 12. A latex is formed which can be used for coating paper or the like.

Example 23

About 200 parts of a polyester having a molecular weight of about 2000, an hydroxyl number of about 56 and an acid number of about 1, about 44 parts of an 80 percent 2,4-toluylene diisocyanate and 20 percent 2,6-toluylene diisocyanate mixture, about 1 part stannous octoate and about 2 parts Emulphor EL719 are mixed together. The resulting mixture is mixed with about 2000 parts of a protective colloid solution of the type prepared in Example 12. A dispersion of particles is obtained which can be used as a latex for coating paper or the like.

Example 24

About 3 parts Emulphor EL719 and 20 parts toluylene diamine are dissolved in about 300 parts water at room temperature. A separate mixture is prepared of 170 parts of poly(oxypropylene) glycol having a molecular weight of about 2000 and an hydroxyl number of about 56, about 45 parts of an 80 percent 2,4-toluylene diisocyanate and 20 percent 2,6-toluylene diisocyanate mixture and 1 part stannous octoate. The latter mixture is prepared at room temperature and, within two minutes after the toluylene diisocyanate is added, the mixture is poured rapidly into the water solution of toluylene diamine. The toluylene diamine solution is agitated as the other mixture is added thereto and agitation is continued until discrete particles are formed which will not agglomerate when the agitation is stopped. The resulting product is separated from the liquid phase by filtering, is washed with water and dried. The filtrate is practically colorless indicating that practically all of the toluylene diamine was removed from the aqueous phase and reacted with toluylene diisocyanate. This product can be cured later by heating and pressing after mixing it on a rubber mill with sufficient additional polyisocyanate to provide at least an equivalent amount based on the reactive hydrogen content. For example, a portion of the product is cured by mixing about 10 parts 2,4-toluylene diisocyanate dimer with 100 parts product and heating the mixture at a temperature of about 280° F. for about 30 minutes at abount 2000 pounds per square inch pressure.

Example 25

Example 24 is repeated except only 10 parts toluylene diamine are dissolved in the water. A pinkish-tan colored polymer in the form of discrete particles is obtained.

A portion of the product is cured by compression molding at about 300° F. at about 4000 pounds per square inch pressure without addition of polyisocyanate.

Example 26

About 100 parts by weight poly(oxypropylene) glycol having a molecular weight of about 2000 and a hydroxyl number of about 56, about 25 parts of an 80 percent 2,4-toluylene diisocyanate and 20 percent 2,6-toluylene diisocyanate mixture and about 0.5 part triethylene diamine are mixed together. Substantially immediately after the mixture is formed, it is poured into about 300 parts water. The water contains about 0.5 percent by weight Emulphor EL719. Agitation is continued until particles of a solid polyurethane are obtained. The particles are then separated from the water by filtering and drying in a suitable oven.

It is to be understood that any of the other suitable catalysts can be substituted for the ones used in the foregoing examples. Likewise, any other suitable compound having reactive hydrogen can be used. Other polyisocyanates indicated as suitable herein can be substituted for those used in the examples.

In some embodiments of the invention, where it is desirable to build in urea groups in the polymer, an organic diamine and/or amino alcohol is dissolved in the water phase. The amount of amino alcohol or polyamine used will vary with the properties desired in the product. The amino group will react more rapidly than either water or the alcoholic hydroxyl groups of the reaction mixture with —NCO groups. However, in all systems some water will react with the —NCO groups so some urea groups will be built into the polymer by reaction with water as well as reaction wtih amino groups.

The inclusion of an amino alcohol in the water phase is particularly important in some embodiments because the amino group reacts first with the —NCO group and acts as a chain stopper because the hydroxyl group is not so reactive. For this reason, it is often preferred to use an amino alcohol in the water phase.

Examples of suitable polyamines include water-soluble diamines, such as, for example, ethylene diamine, propylene diamine, 2,4-toluylene diamine, 2,6-toluylene diamine, 1,5-naphthylene diamine, 1,6-naphthylene diamine and the like. In some embodiments, a liquid amine, which is water-insoluble but is dispersible in water such as, for example, butylene diamine, pentamethylene diamine or the like can be used. Suitable amino alcohols are for example, monoethanol amine, monopropanol amine, N-ethyl-N-phenyl ethanol amine, 2-amino-2-methyl-1-propanol, the polyether amino alcohols represented by the general formula $HO(C_2H_4O)_n—(CH_2)_3NH_2$ wherein $n$ is an integer preferably of from 1 to 10, including for example, 3-aminopropyl ethers of ethylene glycol, diethylene glycol or triethylene glycol and similar products prepared by reduction of condensates of 1 mol acrylonitrile and 1 mol of a polyol or the reaction product of the condensate of 1 mol of a cyanohydrin with an alkylene oxide. Other suitable polyamines include the polyether polyamines formed by reducing the condensation product of 1 mol acrylonitrile with 0.5 mol of a diol such as ethylene glycol, 0.33 mol of a triol such as glycerine, 0.25 mol of a tetrol such as N,N, N'N'-tetrakis (2-hydroxy propyl) ethylene diamine and the like.

Although the invention is made possible primarily be-because of the inclusion of the catalyst specified herein in the process, it is also advisable to maintain other critical limitations for best results. For example, best results are obtained if the amount of polyisocyanate used is such that the mixture mixed with the water contains at least 0.5 equivalent of polyisocyanate per equivalent of reactive hydrogen and preferably from about 0.5 —NCO groups to 10 —NCO groups per reactive hydrogen atom in the mixture which is added to the water. If the product is to be used as a millable gum, it should have terminal groups containing reactive hydrogen instead of —NCO. For this reason, the amount of polyisocyanate used and the length of reaction time in the water are adjusted so that the product will have a minimum number of —NCO groups if a millable gum is desired. The water will react with all terminal —NCO groups not otherwise reacted if agitation is continued long enough.

It is preferred to use a volume of water at least equal to the volume of organic phase added thereto. Usually the volume of water will be somewhat greater than the volume of organic phase. If a latex is to be formed, it is preferred that the solid content of the latex after its formation be within the range of from about 10 percent to about 50 percent by weight solids.

The amount of amine or amino alcohol used in the water phase can be varied over wide limits. The purpose of the amino groups is to build in urea groups in the polymer. Since the amino groups will react with the NCO more rapidly than either the alcoholic hydroxyl groups or water with the —NCO groups, the urea groups can be placed more often in the chain through the use of a compound containing amino groups. It is preferred that the amount of diamine be such that the resulting polymer will contain from about 0.05 to about 5 urea groups per amide and/or urethane group. Ordinarily, best results will be obtained if the number of amine groups in the water does not exceed about 1 for each 2 —NCO groups present in the organic phase.

Any catalytic amount of catalyst can be used. Preferably, from about 0.001 part to about 3 parts catalyst per 100 parts of the organic compound having carboxyl or hydroxyl groups are used. The amount of emulsifier used will depend on the particle size required and will vary over wide limits. Preferably, the amount of emulsifier will be within the range of from 0 percent to 5 percent by weight of the water used. The amount of protective colloid used can also vary over a wide range but will be preferably within the range of 0 percent to 5 percent by weight based on the water used.

Although the invention has been described in considerable detail for the purpose of illustration, it is to be understood that variations may be made therein by those skilled in the art without departing from the spirit of the invention and the scope of the claims.

What is claimed is:

1. A method for suspending a polymer in water which comprises preparing a mixture of compounds which will react to form a polyurethane, submerging the said mixture in water before any substantial chemical reaction resulting in increased viscosity has taken place between the said compounds, stirring the resulting two phase system to disperse the organic phase as discrete particles in the water, said water containing an emulsifying agent, and maintaining the dispersion until the said particles remain discrete while the system is quiescent, said mixture of compounds which will react to form a polyurethane comprising an organic compound free from primary and secondary amino groups and having at least two members selected from the group consisting of hydroxyl and carboxyl groups, a molecular weight of at least about 60, and a reactivity number of not more than about 1900, said compound being capable of reacting with an organic polyisocyanate to form a member selected from the group consisting of urethane and amide linkages, at least about 0.5 equivalent of organic polyisocyanate per equivalent of reactive hydrogen in said organic compound and a catalytic amount of a catalyst which promotes reaction between —NCO and the reactive hydrogen of said organic compound in preference to the reaction between —NCO and water.

2. A method for suspending a polymer in water which comprises preparing a mixture of compounds which will react to form a polyurethane, submerging the resulting mixture in water before any substantial chemical reaction resulting in increased viscosity has taken place between the said compounds, stirring the resulting two phase system to form a dispersion of discrete droplets and maintaining the dispersion of the droplets in water, said water containing an emulsifying agent, until solid particles of polymer are formed which remain discrete while the system is quiescent, said mixture of compounds which are reacted to form a polyurethane comprising an organic compound free from primary and secondary amino groups and having at least two members selected from the group consisting of hydroxyl and carboxyl groups, a molecular weight of at least about 60, and a reactivity number of not more than about 1900, said compound being capable of reacting with an organic polyisocyanate to form a member selected from the group consisting of urethane and amide linkages, at least about 0.5 equivalent of organic polyisocyanate per equivalent of reactive hydrogen in said organic compound and a catalytic amount of a catalyst which promotes reaction between —NCO and the reactive hydrogen of said organic compound in preference to the reaction between —NCO and water.

3. The process of claim 1 wherein the water contains a protective colloid after the dispersion of discrete particles.

4. The process of claim 2 wherein the solid polymer is separated from the water phase.

5. A method for suspending a polymer in water which comprises preparing a mixture of compounds which will react to form a polyurethane, submerging the said mixture in water before any substantial chemical reaction resulting in increased viscosity has taken place between the said compounds, stirring the resulting two phase system until a soft, pasty solid is obtained which is broken up into particles which disperse in the water, and maintaining the dispersion of the said particles until chemical reaction has produced solid particles of polymer which remain discrete while the system is quiescent, said mixture of compounds which will react to form a polyurethane comprising an organic compound free from primary and secondary amino groups and having at least two members selected from the group consisting of hydroxyl and carboxyl groups, a molecular weight of at least about 60, and a reactivity number of not more than about 1900, said compound being capable of reacting with an organic polyisocyanate to form a member selected from the group consisting of urethane and amide linkages, at least about 0.5 equivalent of organic polyisocyanate per equivalent of reactive hydrogen in said or- -ganic compound and a catalytic amount of a catalyst which promotes reaction between —NCO and the reactive hydrogen of said organic compound in preference to the reaction between —NCO and water.

6. The process of claim 1 wherein the catalyst is a stannous salt of a carboxylic acid having from 2 to 18 carbon atoms.

7. The process of claim 1 wherein the catalyst is an organo tin compound having at least one carbon to tin bond.

8. The process of claim 5 wherein the product is separated from the water phase.

9. The process of claim 5 wherein the organic compound having reactive hydrogen and a molecular weight of at least 60 is heated to 30° C. to 75° C. before it is mixed with the polyisocyanate.

10. The process of claim 9 wherein additional polyisocyanate is added in the curing step.

11. The process of claim 10 wherein the polyisocyanate added during the curing step is a solid polyisocyanate at room temperature.

12. The process of claim 1 wherein the organic compound having a molecular weight of at least about 60 is selected from the group consisting of a polyhydric poly (alkylene ether), a polyester, a polyacetal, a polythioether glycol and a copolymer of carbon monoxide and an olefin having a molecular weight of at least about 500, an acid number of less than 10 and an hydroxyl number of not more than about 225.

13. The process of claim 1 wherein the water phase contains a compound having at least one amino group.

14. The process of claim 1 wherein the water phase contains an amino alcohol.

15. The process of claim 2 wherein the water phase contains an amino alcohol.

16. The process of claim 5 wherein the water phase contains an amino alcohol.

17. The process of claim 1 wherein the water phase contains a water-soluble diamine.

18. The process of claim 2 wherein the water phase contains a water-soluble diamine.

19. The process of claim 5 wherein the water phase contains a water-soluble diamine.

20. A method for suspending a polymer in water which comprises preparing a mixture of compounds which will react to form a polyurethane, submerging the said mixture in water before any substantial chemical reaction resulting in increased viscosity has taken place between the said compounds, stirring the resulting two phase system to disperse the organic phase as discrete particles in the water, said water containing an emulsifying agent, and maintaining the dispersion until chemical reaction is essentially completed, said mixture of compounds which will react to form a polyurethane comprising an organic compound free from primary and secondary amino groups and having at least two members selected from the group consisting of hydroxyl and carboxyl groups, a molecular weight of at least about 60, and a reactivity number of not more than about 1900, said compound being capable of reacting with organic polyisocyanate to form a member selected from the group consisting of urethane and amide linkages, at least about 0.5 equivalent of organic polyisocyanate per equivalent of reactive hydrogen in said organic compound and a catalytic amount of a catalyst which promotes reaction between —NCO and the reactive hydrogen of said organic compound in preference to the reaction between —NCO and water.

References Cited by the Examiner
UNITED STATES PATENTS

| | | | |
|---|---|---|---|
| 2,955,056 | 10/60 | Knox | 260—2.5 |
| 2,968,575 | 1/61 | Mallonee | 260—29.2 |
| 2,975,147 | 3/61 | Abbott et al. | 260—29.2 |

MURRAY TILLMAN, *Primary Examiner.*

LEON J. BERCOVITZ, *Examiner.*